United States Patent
Fang et al.

(10) Patent No.: US 9,514,311 B2
(45) Date of Patent: Dec. 6, 2016

(54) SYSTEM AND METHOD FOR UNLOCKING SCREEN

(75) Inventors: Wen Fang, Shenzhen (CN); Yusheng Cao, Shenzhen (CN); Yan Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 164 days.

(21) Appl. No.: 14/379,575

(22) PCT Filed: May 28, 2012

(86) PCT No.: PCT/CN2012/076178
§ 371 (c)(1),
(2), (4) Date: Aug. 19, 2014

(87) PCT Pub. No.: WO2013/123738
PCT Pub. Date: Aug. 29, 2013

(65) Prior Publication Data
US 2015/0033326 A1 Jan. 29, 2015

(30) Foreign Application Priority Data

Feb. 23, 2012 (CN) .......................... 2012 1 0041970

(51) Int. Cl.
*G06F 21/60* (2013.01)
*G06F 3/0488* (2013.01)
(Continued)

(52) U.S. Cl.
CPC .............. *G06F 21/60* (2013.01); *G06F 3/0488* (2013.01); *G06F 3/04842* (2013.01); *G06F 3/04883* (2013.01); *H04M 1/67* (2013.01); *H04M 2250/22* (2013.01)

(58) Field of Classification Search
CPC .. G06F 21/60; G06F 3/04842; G06F 3/0488; G06F 3/04883; H04M 1/67; H04M 2250/22
See application file for complete search history.

(56) References Cited

U.S. PATENT DOCUMENTS 6,809,724 B1 * 10/2004 Shiraishi ................. G06F 1/163
345/157
8,954,895 B1 * 2/2015 Yaksick .............. G06F 3/04883
715/863

(Continued)

FOREIGN PATENT DOCUMENTS

CN 101634925 A 1/2010
CN 101794188 A 8/2010

(Continued)

OTHER PUBLICATIONS

Yujie et al (CN101984396A, See Google Patents English Translation), pp. 1-8.*

(Continued)

*Primary Examiner* — Theodore C. Parsons
*Assistant Examiner* — James J Wilcox
(74) *Attorney, Agent, or Firm* — Oppedahl Patent Law Firm LLC (57) ABSTRACT

Disclosed are a method for unlocking a screen and a system for installing a screen. It is determined whether to unlock the screen by calculating an angle between a starting position and a current position of a touch point on the screen with the unlocking reference point as a vertex of the angle. With a technical solution of the disclosure, no path or destination position for screen unlocking is defined, with more casual operation, enhanced user experience, and simpler setting, thereby facilitating usage. Moreover, unlocking by mistake can also be prevented by the setting.

9 Claims, 8 Drawing Sheets (51) Int. Cl.
    *G06F 3/0484* (2013.01)
    *H04M 1/67* (2006.01)

(56) References Cited

U.S. PATENT DOCUMENTS

| | | | | |
|---|---|---|---|---|
| 9,323,340 | B2* | 4/2016 | Pantel | G06F 3/017 |
| 9,383,887 | B1* | 7/2016 | Khafizov | G06F 3/0482 |
| 9,405,400 | B1* | 8/2016 | Khafizov | G06F 3/0418 |
| 2007/0150842 | A1 | 6/2007 | Chaudhri | |
| 2007/0257895 | A1 | 11/2007 | Tolaio | |
| 2008/0122796 | A1* | 5/2008 | Jobs | G06F 3/0488 345/173 |
| 2008/0168403 | A1 | 7/2008 | Westerman | |
| 2008/0211779 | A1 | 9/2008 | Pryor | |
| 2009/0167702 | A1 | 7/2009 | Nurmi | |
| 2009/0241072 | A1 | 9/2009 | Chaudhri | |
| 2010/0037185 | A1* | 2/2010 | Li | G06F 3/04847 715/863 |
| 2010/0127998 | A1* | 5/2010 | Hyun | G06F 3/04883 345/173 |
| 2010/0159995 | A1* | 6/2010 | Stallings | G06F 3/0488 455/566 |
| 2010/0182137 | A1 | 7/2010 | Pryor | |
| 2010/0192109 | A1 | 7/2010 | Westerman | |
| 2010/0211920 | A1 | 8/2010 | Westerman | |
| 2010/0248689 | A1* | 9/2010 | Teng | H04M 1/67 455/411 |
| 2010/0315365 | A1* | 12/2010 | Ohta | A63F 13/06 345/173 |
| 2011/0032200 | A1* | 2/2011 | Park | G06F 3/0236 345/173 |
| 2011/0037725 | A1 | 2/2011 | Pryor | |
| 2011/0247065 | A1 | 10/2011 | Melnyk | |
| 2011/0296356 | A1 | 12/2011 | Chaudhri | |
| 2011/0300831 | A1 | 12/2011 | Chin | |
| 2012/0023458 | A1 | 1/2012 | Chaudhri | |
| 2012/0133484 | A1* | 5/2012 | Griffin | G06F 21/51 340/5.54 |
| 2012/0293438 | A1 | 11/2012 | Chaudhri | |
| 2013/0044071 | A1 | 2/2013 | Hu | |
| 2013/0185677 | A1 | 7/2013 | Chaudhri | |
| 2013/0185678 | A1 | 7/2013 | Chaudhri | |
| 2013/0185680 | A1 | 7/2013 | Chaudhri | |
| 2013/0190056 | A1 | 7/2013 | Chaudhri | |
| 2013/0227450 | A1 | 8/2013 | Na | |
| 2013/0265218 | A1* | 10/2013 | Moscarillo | G06F 3/017 345/156 |
| 2015/0177972 | A1* | 6/2015 | Tsai | G06F 3/0488 715/771 |
| 2015/0185924 | A1* | 7/2015 | Chang | G06F 3/044 345/174 |
| 2015/0277697 | A1* | 10/2015 | Liu | G06F 3/0488 345/173 |
| 2015/0324093 | A1* | 11/2015 | Wada | G06F 3/0481 715/763 |
| 2016/0042172 | A1* | 2/2016 | Chiplunkar | G06F 21/36 726/19 |
| 2016/0092022 | A1* | 3/2016 | Lee | G06F 3/044 345/174 |
| 2016/0098139 | A1* | 4/2016 | Chang | G06F 3/0416 345/174 |

FOREIGN PATENT DOCUMENTS

| | | |
|---|---|---|
| CN | 101866259 A | 10/2010 |
| CN | 101907968 A | 12/2010 |
| CN | 101957715 A | 1/2011 |
| CN | 101984396 A | 3/2011 |
| EP | 2631779 A1 | 8/2013 |
| JP | 2008099190 A | 4/2008 |
| JP | 2010160784 A | 7/2010 |
| JP | 2011008697 A | 1/2011 |
| JP | 2011184816 A | 9/2011 |
| JP | 2011198004 A | 10/2011 |

OTHER PUBLICATIONS

International Search Report in international application No. PCT/CN2012/076178, mailed on Nov. 29, 2012.
English Translation of the Written Opinion of the International Search Authority in international application No. PCT/CN2012/076178, mailed on Nov. 29, 2012.
Supplementary European Search Report in European application No. 12869313.2, mailed on Jan. 20, 2015.

* cited by examiner

SYSTEM AND METHOD FOR UNLOCKING SCREEN

TECHNICAL FIELD

The disclosure relates to the field of mobile terminal application, and particularly to a system and method for unlocking a screen.

BACKGROUND

With gradual popularization of mobile phones, a variety of methods for unlocking a screen of a mobile phone are developed in recent years. Initially, a screen of a key-pressing mobile phone is unlocked by pressing a combination of keys. As for a mobile phone having a touch screen, multiple ways for unlocking a screen, such as by touching the screen along a fixed track, moving an unlocking element to a target area, filling a blank area, etc., are developed gradually. At the same time, techniques of unlocking a mobile phone according to physical characteristics of a human body, such as by identifying a face, a fingerprint, a voice, etc., are becoming well known.

At present, an image can unlock the screen along a predetermined path displayed. A screen is unlocked according to a predetermined gesture when a touch matching the movement of the moving image with a predefined path on the touch screen is detected. This unlocking process cannot be performed unless both an unlocking path and a gesture are prearranged. At the same time, complicated track or target arrangement on an unlocking interface may lead to failure in unlocking by some (particularly elderly) users.

At present, alternatively, once a locked touch screen is touched, a circle centred on the initial point of contact with a radius of a predetermined unlocking length appears on the touch screen. The screen can be unlocked along any path as long as the sliding movement of an operator goes beyond the circled area. However, the screen may be unlocked by mistake due to an accidental screen touch.

SUMMARY

It is desired that embodiments of the disclosure provide a system and method for unlocking a screen, capable of reducing difficulty in unlocking a screen by some users caused by complicated track or target arrangement on an unlocking interface.

To this end, the disclosure adopts a technical solution as follows.

A method for unlocking a screen, includes steps of:
obtaining a starting position of a touch point on a screen;
determining a position of an unlocking reference point;
obtaining, while the touch point moves on the screen, a current position of the touch point; and
calculating an angle between the starting position of the touch point and the current position of the touch point with the unlocking reference point as a vertex of the angle, and unlocking the screen when the angle is larger than a pre-set unlocking angle.

In an embodiment, the step of determining a position of an unlocking reference point may include:
selecting the unlocking reference point as any point with a distance to the starting position of the touch point being equal to a pre-set standard length in the screen.

In an embodiment, the step of determining a position of an unlocking reference point may include:

dividing the screen into at least one area according to a pre-set rule;
generating a benchmark point in each area resulting from dividing the screen; and
selecting a benchmark point meeting a pre-set standard as the unlocking reference point according to the starting position of the touch point.

In an embodiment, the step of selecting a benchmark point meeting a pre-set standard as the unlocking reference point may include:
determining in the screen a local area containing the starting position of the touch point; and
selecting the benchmark point of the local area as the unlocking reference point.

In an embodiment, the step of selecting a benchmark point meeting a pre-set standard as the unlocking reference point may include:
setting a standard distance between the starting position of the touch point and a benchmark point;
calculating a distance between the starting position of the touch point and a benchmark point of a local area containing the starting position of the touch point;
comparing the calculated distance with the standard distance;
selecting, when the calculated distance is larger than the standard distance, the benchmark point of the local area as the unlocking reference point; or
selecting, when the calculated distance is smaller than the standard distance, a benchmark point in an area nearest to the starting position of the touch point other than the local area as the unlocking reference point.

In an embodiment, the method may further include a step of: after the position of the unlocking reference point is determined,
displaying, on the screen, an unlocking starting line starting from the unlocking reference point and passing through the starting position of the touch point.

In an embodiment, the method may further include a step of:
displaying, on the screen, an unlocking target line starting from the unlocking reference point and forming an angle equal to the pre-set unlocking angle with the unlocking starting line.

In an embodiment, the method may further include a step of:
displaying, on the screen, a sector centred on the unlocking reference point with a radius of a pre-set length,
wherein the sector is defined on one side by the unlocking starting line and on the other side by a straight line defined by the unlocking reference point and the current position of the touch point.

A system for unlocking a screen, includes a screen detecting module, a reference point determining module, an angle calculating module, and an unlocking module, wherein
the screen detecting module is configured to detect a position of a touch point on a screen, and send the position of the touch point to the angle calculating module;
the reference point determining module is configured to determine a position of an unlocking reference point, and send the position of the unlocking reference point to the angle calculating module;
the angle calculating module is configured to calculate an angle between a starting position of the touch point and a current position of the touch point with the unlocking reference point as a vertex of the angle, and send the calculated angle to the unlocking module; and the unlocking module is configured to compare the calculated angle with a pre-set unlocking angle, and unlock the screen when the angle is larger than the pre-set unlocking angle.

In an embodiment, the reference point determining module may be configured to select the unlocking reference point as any point with a distance to the starting position of the touch point being equal to a pre-set standard length in the screen.

In an embodiment, the reference point determining module may include:

an area dividing module, configured to divide the screen into at least one area according to a pre-set rule;

a benchmark point generating module, configured to generate a benchmark point in each area resulting from dividing the screen by the area dividing module; and a reference point selecting module, configured to select a benchmark point meeting a pre-set standard as the unlocking reference point according to the starting position of the touch point.

In an embodiment, the reference point selecting module may include a distance setting module, a distance calculating module, and a distance comparing module, wherein the distance setting module is configured to set a standard distance between the starting position of the touch point and a benchmark point, and send the standard distance to the distance comparing module;

the distance calculating module is configured to calculate a distance between the starting position of the touch point and a benchmark point of a local area containing the starting position of the touch point, and send the calculated distance to the distance comparing module; and the distance comparing module is configured to compare the calculated distance with the standard distance; and select, when the calculated distance is larger than the standard distance, the benchmark point of the local area as the unlocking reference point; or select, when the calculated distance is smaller than the standard distance, a benchmark point in an area nearest to the starting position of the touch point other than the local area as the unlocking reference point.

In an embodiment, the system may further include:

an angle setting module, configured to set the pre-set unlocking angle, and provide the pre-set unlocking angle to the unlocking module.

In an embodiment, the system may further include:

an unlocking displaying module, configured to display, on the screen, an unlocking starting line starting from the unlocking reference point and passing through the starting position of the touch point.

In an embodiment, the unlocking displaying module is further configured to display, on the screen, an unlocking target line starting from the unlocking reference point and forming an angle equal to the pre-set unlocking angle with the unlocking starting line.

In an embodiment, the unlocking displaying module may be further configured to display, on the screen, a sector centred on the unlocking reference point with a radius of a pre-set length, wherein the sector is defined on one side by the unlocking starting line and on the other side by a straight line defined by the unlocking reference point and the current position of the touch point.

With a technical solution of the disclosure, during unlocking only a starting position and a current position of a touch point are of interest, an angle between a starting position and a current position of a touch point on the screen is calculated, with the unlocking reference point as a vertex of the angle. It is determined whether to unlock the screen according to the angle. With a technical solution of the disclosure, no path or destination position for screen unlocking is defined, with more casual operation and enhanced user experience. The disclosure requires no complicated setting, thereby facilitating usage. Moreover, unlocking by mistake can be prevented effectively by setting a certain unlocking angle, thus leading to a good application space.

DETAILED DESCRIPTION

Specific embodiments of the disclosure are further elaborated below with reference to drawings.

Figure 1:
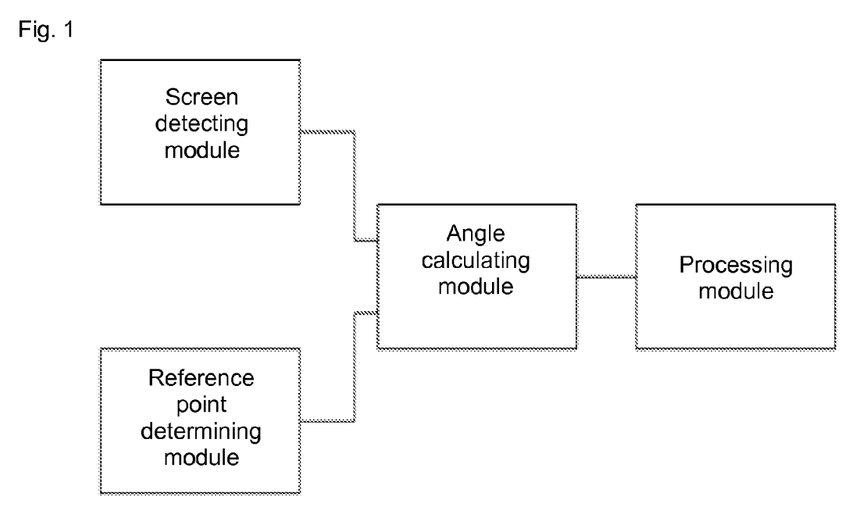
FIG. 1 is a schematic diagram of a structure of a system for unlocking a screen according to the disclosure.

A system for unlocking a screen according to the disclosure is as shown in FIG. 1. According to an embodiment of the disclosure, the system includes a screen detecting module, a reference point determining module, an angle calculating module, and an unlocking module. The screen detecting module is configured to obtain a position (including the starting position and the current position) of a touch point on the screen. The reference point determining module is configured to generate an unlocking reference point. The angle calculating module is configured to obtain an angle between the starting position of the touch point and the current position of the touch point with the unlocking reference point as a vertex of the angle. The unlocking module is configured to unlock the screen when the angle is larger than a pre-set unlocking angle.

In an embodiment, when the screen is in a locked state and a user touches the screen, the screen detecting module obtains the starting position of the touch point on the screen; meanwhile, the reference point determining module sends the position of the unlocking reference point to the angle calculating module. After that, the user keeps touching the screen and sliding on the screen, and the screen detecting module keeps obtaining the current position of the touch point, and sends the obtained starting position and current position to the angle calculating module. After obtaining the unlocking reference point, as well as both the starting position and current position of the touch point, the angle calculating module calculates an angle between a starting position of the touch point and a current position of the touch point with the unlocking reference point as a vertex of the angle, and sends the calculated angle to the unlocking module. The unlocking module compares the angle provided by the angle calculating module with the pre-set unlocking angle, and unlocks the screen when the calculated angle is larger than the pre-set unlocking angle.

In an embodiment, the reference point determining module may be specifically configured to select the unlocking reference point as any point with a distance to the starting position of the touch point being equal to a pre-set standard length in the screen. In an embodiment, when the starting position of the touch point is close to a border of the screen, the unlocking reference point is selected in an area opposite to the border. For example, when the starting position of the touch point is close to a right border of the screen, the unlocking reference point is selected in a semicircle to the left of the touch point.

In an embodiment, the system may further include an area dividing module, a benchmark point generating module, and a reference point selecting module. The area dividing module is configured to divide the screen into at least one area according to a pre-set rule. The benchmark point generating module is configured to generate a benchmark point in each area resulting from dividing the screen. The reference point selecting module is configured to select a benchmark point meeting a standard as the unlocking reference point according to the starting position of the touch point. The benchmark point of the local area containing the starting position of the touch point may be directly selected as the unlocking reference point.

Specifically, the unlocking reference point may also be selected by a distance setting module, a distance calculating module, and a distance comparing module. The distance setting module sets, in advance, a standard distance between the starting position of the touch point and a benchmark point, and provides the set standard distance to the distance comparing module. When the user starts to touch the screen, the distance calculating module calculates a distance between the starting position of the touch point and a benchmark point of a local area containing the starting position of the touch point, and provides the calculated distance to the distance comparing module. The distance comparing module then compares the calculated distance with the standard distance; and selects, when the calculated distance is larger than the standard distance, the benchmark point of the local area as the unlocking reference point; or selects, when the calculated distance is smaller than the standard distance, a benchmark point in an area nearest to the starting position of the touch point other than the local area as the unlocking reference point.

The system for unlocking a screen according to the disclosure may further include an angle setting module configured to set the pre-set unlocking angle, and provide the pre-set unlocking angle to the unlocking module such that a determination on whether to unlock the screen may be made.

To ensure a display effect and facilitate use by the user, the system of the disclosure may further include a display processing module, which is configured to display, on the screen, an unlocking starting line starting from the unlocking reference point and passing through the starting position of the touch point. The unlocking displaying module may be further configured to display, on the screen, an unlocking target line starting from the unlocking reference point and forming an angle equal to the pre-set unlocking angle with the unlocking starting line. The unlocking displaying module may be further configured to display, in an area formed by the unlocking starting line and the unlocking target line on the screen, a block of a sector centred on the unlocking reference point with a radius of a pre-set length.

Figure 2:
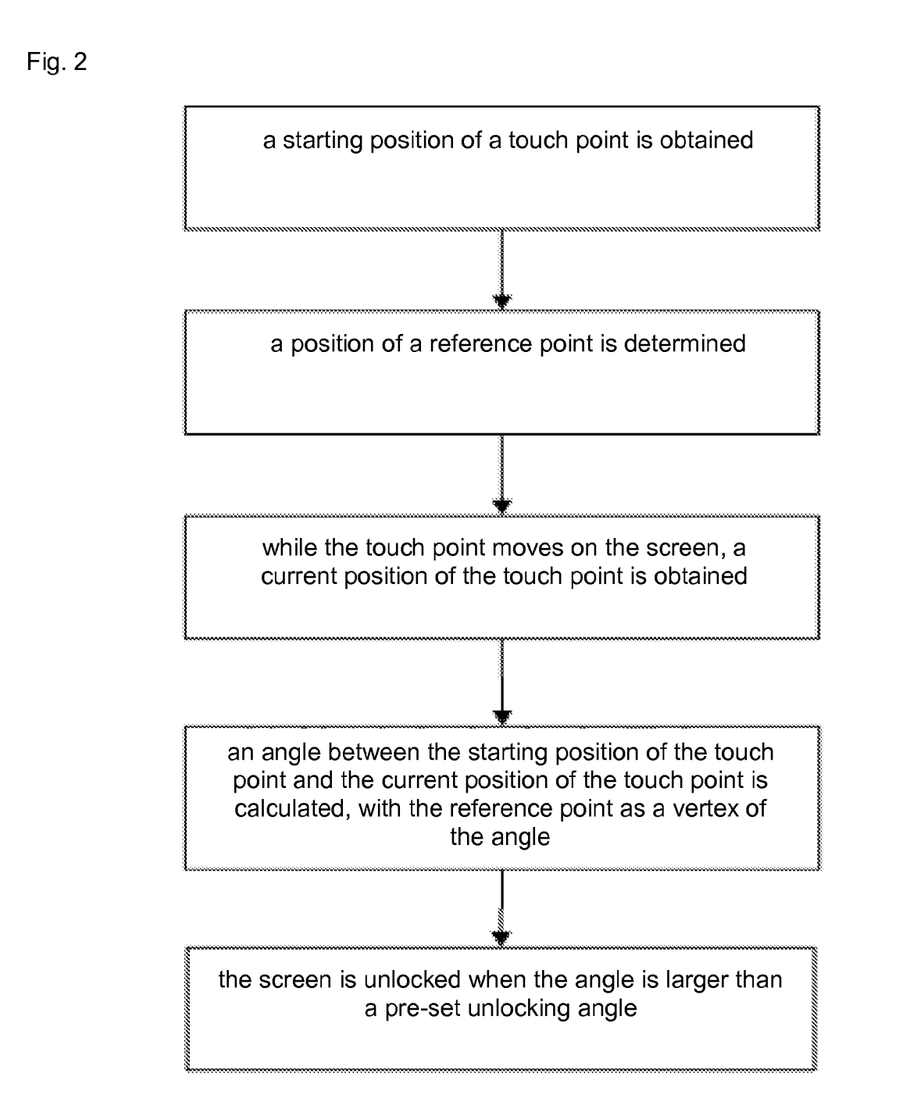
FIG. 2 is a flow chart of a method for unlocking a screen according to Embodiment 1 of the disclosure.

FIG. 2 is a flow chart of a method for unlocking a screen according to Embodiment 1 of the disclosure. The method includes steps as follows. A starting position of a touch point on a screen is obtained; a position of a reference point is determined; while the touch point moves on the screen, a current position of the touch point is obtained; an angle between the starting position of the touch point and the current position of the touch point is calculated, with the reference point as a vertex of the angle; the screen is unlocked when the calculated angle is larger than a pre-set unlocking angle.

Figure 3:
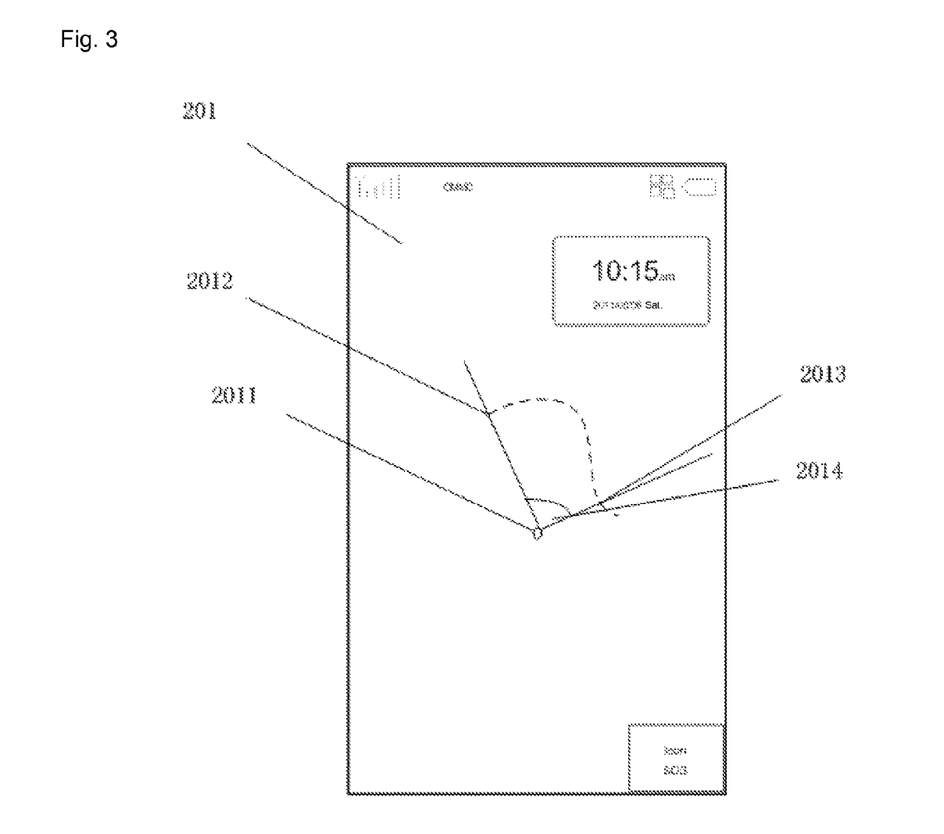
FIG. 3 is a schematic diagram of display on a user interface of a method for unlocking a screen according to Embodiment 1 of the disclosure.

Embodiment 1 is elaborated with reference to FIG. 3. FIG. 3 is a schematic diagram of display on a user interface according to Embodiment 1. On a screen interface 201, when the screen is touched by the user, an input of the user on the touch screen is detected and a starting position 2012 of the touch point is obtained. In this case, an unlocking reference point 2011 is generated in the screen. After the unlocking reference point is generated, the angle 2014 between the starting position of the touch point and the current position 2013 of the touch point, with the unlocking reference point as the vertex of the angle, is calculated continuously according to a newest point on a track input by the user. The screen is unlocked when it is determined that the angle between the current position of the touch point and the starting position of the touch point is larger than the unlocking angle. Note that the current position of the touch point may be the current touch point of a sliding movement on the screen by the user, or the position of a last point touched before the user leaves the screen after the sliding movement.

In determining the position of the unlocking reference point, by setting a standard length in advance, the unlocking reference point may be selected as any point with a distance to the starting position of the touch point being equal to the standard length in the screen. In an embodiment, when the starting position of the touch point is close to a border of the screen, the unlocking reference point is selected in an area opposite to the border. For example, when the starting position of the touch point is close to a right border of the screen, the unlocking reference point is selected in a semicircle to the left of the touch point.

Figure 4:
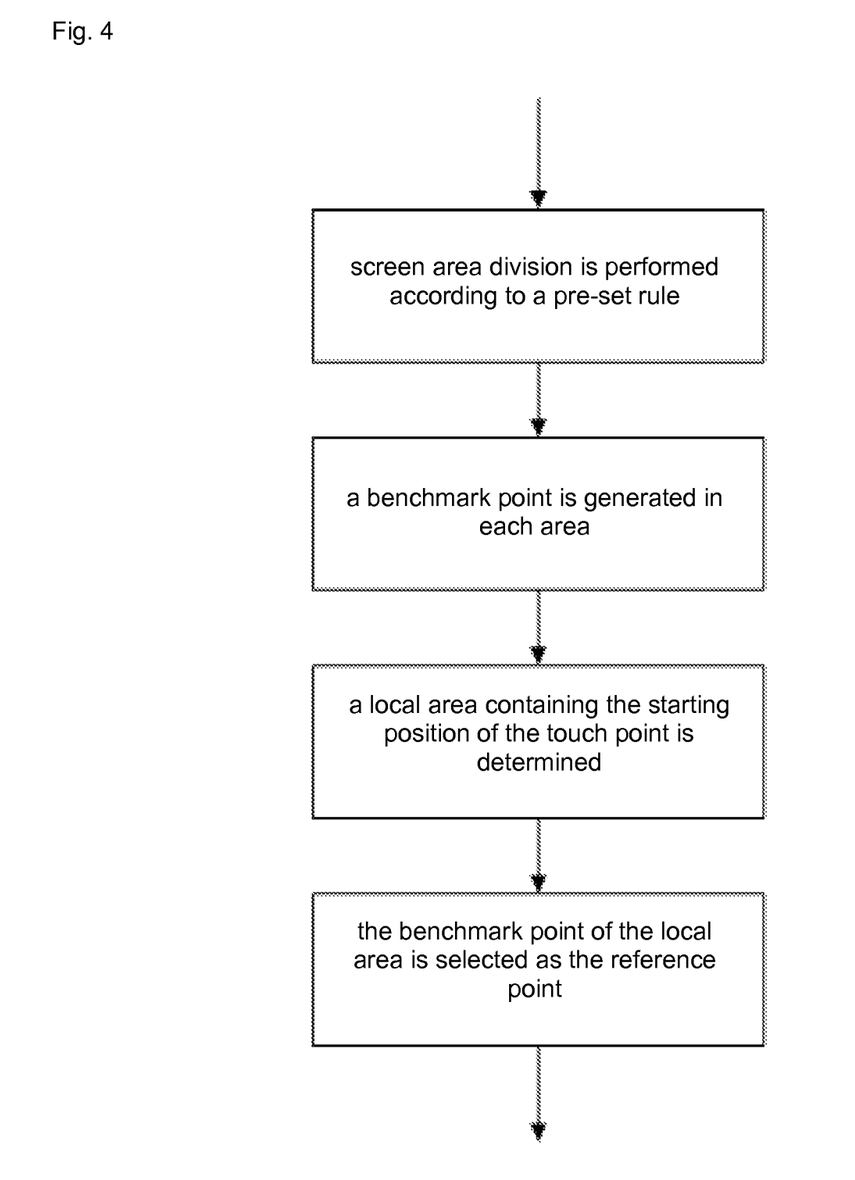
FIG. 4 is a flow chart of a method for unlocking a screen according to Embodiment 2 of the disclosure.

FIG. 4 is a flow chart of a method for unlocking a screen according to Embodiment 2 of the disclosure; Embodiment 2 differs from Embodiment 1 in that the unlocking reference point is generated specifically by: dividing the screen into at least one area according to a pre-set rule; generating a benchmark point in each area resulting from dividing the screen; and selecting a benchmark point meeting a pre-set standard as the unlocking reference point according to the starting position of the touch point.

Figure 5:
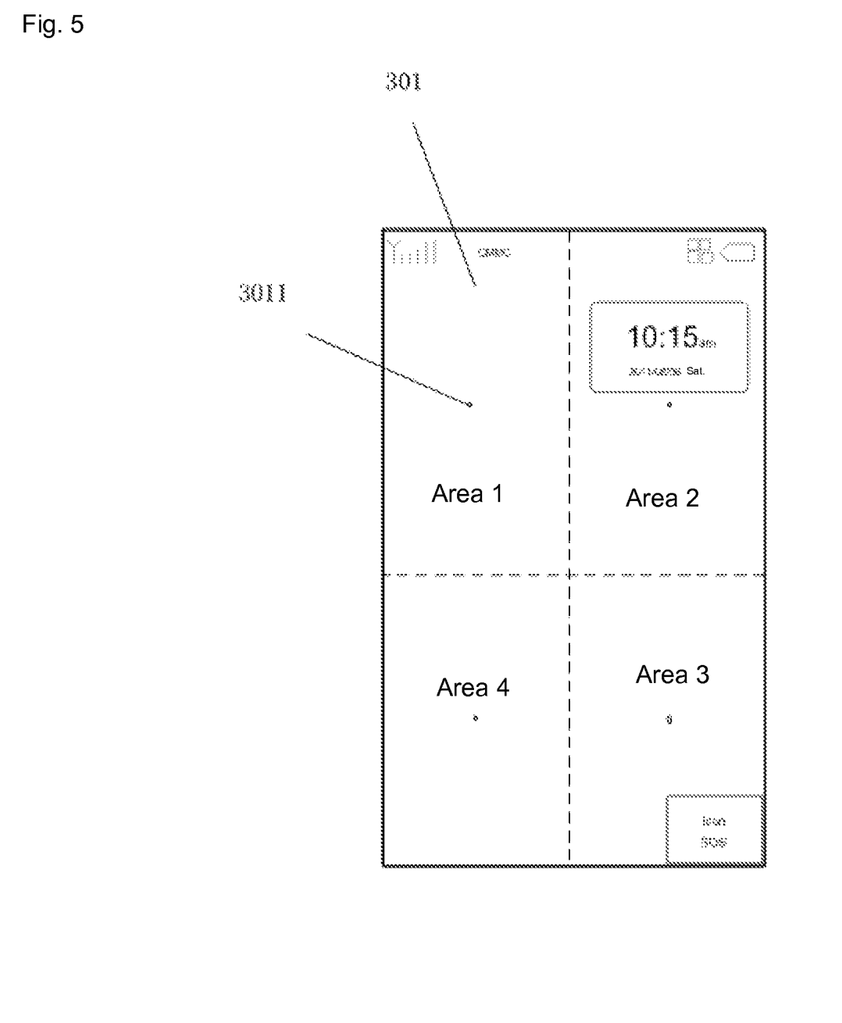
FIG. 5 is a schematic diagram of display on a user interface of a method for unlocking a screen according to Embodiment 2 of the disclosure.

Embodiment 2 is elaborated with reference to FIG. 5, which is a schematic diagram of display on a user interface according to Embodiment 2, in which the local area containing the starting position of the touch point is determined, and the benchmark point of the local area is directly selected as the unlocking reference point. Specifically, in a screen interface 301, the screen is divided into four areas, namely Area 1 to Area 4, according to a longitudinal centre line and a lateral centre line. Taking Area 1 as an example, when the user touches a position in Area 1 of the screen for the first time, that is, the starting position of the touch point falls into Area 1 of the screen, in which case the benchmark point 3011 in Area 1 is selected as the unlocking reference point. Accordingly, if the starting position of the touch point falls into a second area, then the benchmark point of the second area is selected as the unlocking reference point. Determination is then made by taking the selected unlocking reference point as the vertex. In this embodiment, a benchmark point of an area may be set as the centre of the area.

Note that a screen area division scheme is not limited to that in an aforementioned embodiment. The screen may also be divided into one area, namely the centre of the screen may be directly selected as the unlocking reference point. Alternatively, screen area division may be performed according to any other appropriate scheme.

With an aforementioned embodiment, it is possible to avoid a possible excessively-lengthy user unlocking path caused by a constant unlocking reference point. However, if the starting position of the touch point is too close to the unlocking reference point, a slight movement on the screen may then lead to a large calculated angle, which may lead to unlocking by mistake.

Figure 6:
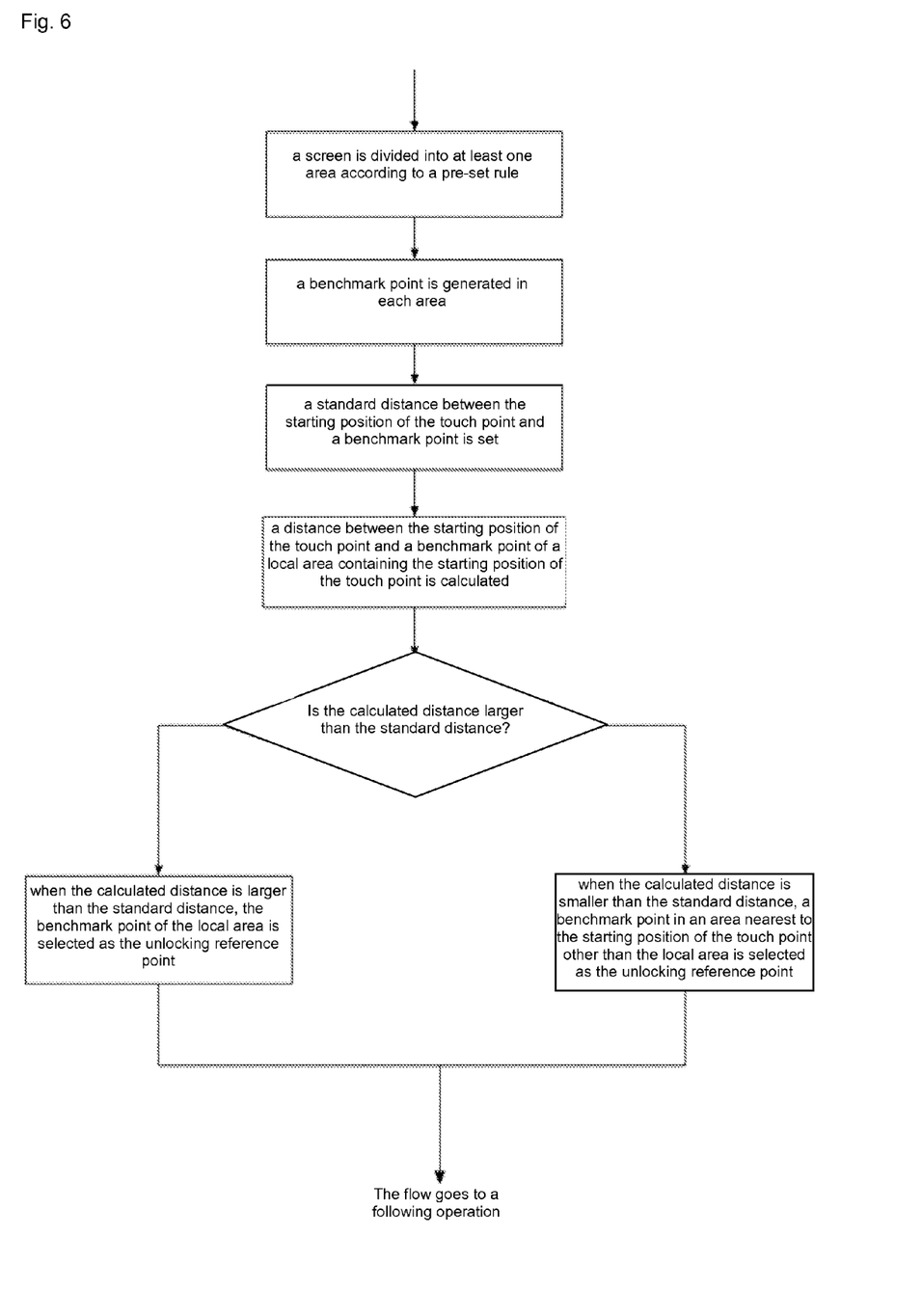
FIG. 6 is a flow chart of a method for unlocking a screen according to Embodiment 3 of the disclosure.

FIG. 6 is a flow chart of a method for unlocking a screen according to Embodiment 3 of the disclosure. Embodiment 3 differs from Embodiment 2 in that a benchmark point meeting the pre-set standard is selected as the unlocking reference point specifically by: setting a standard distance between the starting position of the touch point and a benchmark point; determining a distance between the starting position of the touch point and a benchmark point of a local area containing the starting position of the touch point; comparing the calculated distance with the standard distance; selecting a proper benchmark point as the unlocking reference point according to the result of the comparison. Further, a proper benchmark point may be selected as the unlocking reference point according to the result of the comparison by: selecting, when the calculated distance is larger than the standard distance, the benchmark point of the local area as the unlocking reference point; or selecting, when the calculated distance is smaller than the standard distance, a benchmark point in an area nearest to the starting position of the touch point other than the local area as the unlocking reference point.

Figure 7:
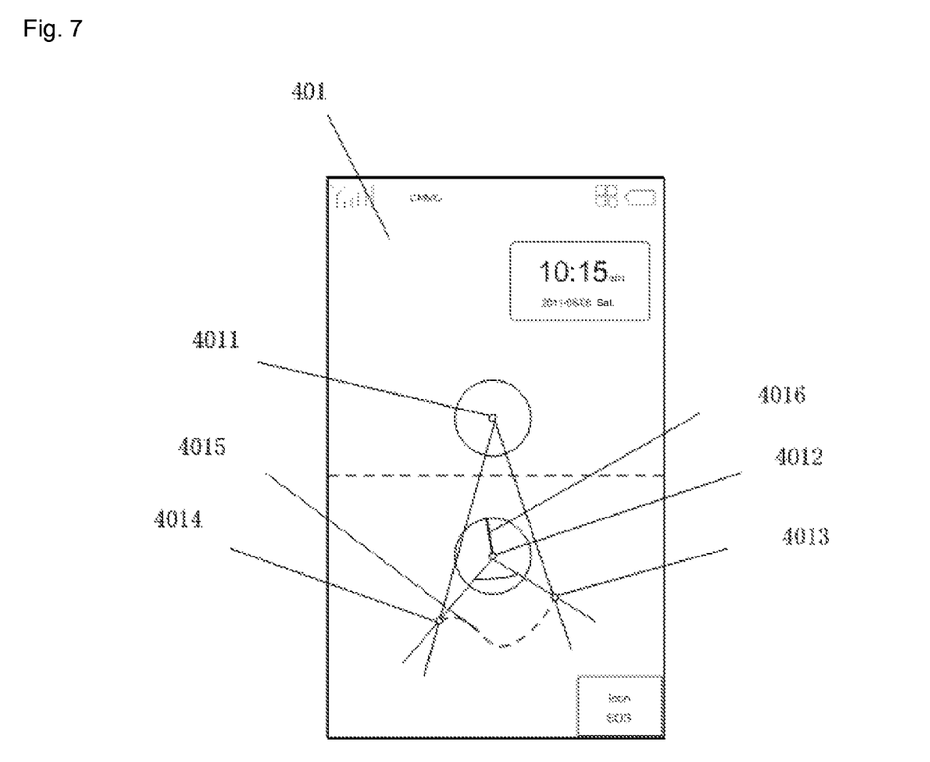
FIG. 7 is a schematic diagram of display on a user interface of a method for unlocking a screen according to Embodiment 3 of the disclosure.

Specifically, Embodiment 3 is further described with reference to FIG. 7. FIG. 7 is a schematic diagram of display on a user interface according to Embodiment 3. In a screen interface 401, the screen is divided into two areas with benchmark points 4011 and 4012, respectively. When the starting position of a touch point, i.e. the first point on the screen touched by the user, falls in the area as shown in the figure, the distance between the starting position 4013 of the touch point and the benchmark Point 4012 is determined, and if the determined distance is larger than the standard distance 4016, then the second benchmark Point 4012 is selected as the unlocking reference point; when the determined distance is smaller than the standard distance 4016, the first benchmark Point 4011 is selected as the unlocking reference point. A determination of whether to unlock the screen is then made.

The above embodiment can ensure that the starting position of the touch point and the unlocking reference point are separated by a certain distance, such that the starting position of the touch point will not be too close to the unlocking reference point, and possible unlocking by mistake due to slight movement on the screen will be prevented.

As to the effect of displaying an unlocking icon, no unlocking icon may be displayed. When no unlocking icon is displayed, the user will experience that the screen may be unlocked just by a random sliding movement of the user across the screen over a certain angle.

Figure 8:
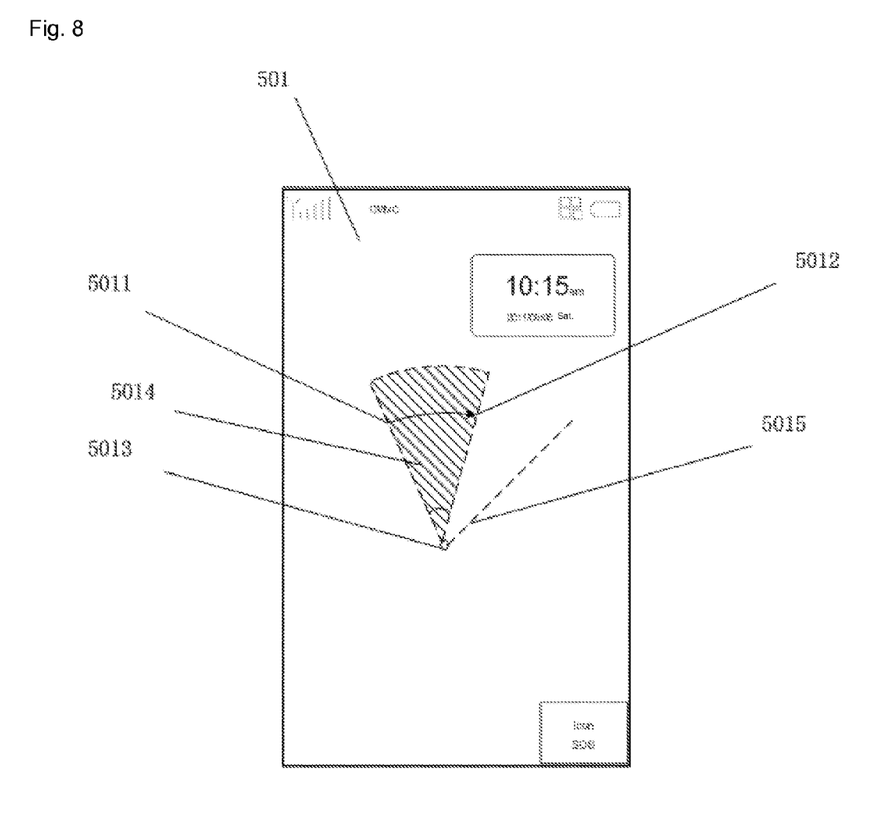
FIG. 8 is a schematic diagram of effect displayed on a user screen interface according to the disclosure.

In an embodiment, an unlocking icon may be generated at a point of a current operation according to the operation of the user, as shown in FIG. 8, which is a schematic diagram of effect displayed on a user screen interface.

When the user touches the screen with a finger or a stylus, an unlocking reference point 5013 is displayed on the screen. An unlocking starting line 5011 starts from the unlocking reference point and passes through the starting position of the touch point; An unlocking target line 5012 starts from the unlocking reference point and forms an angle equal to the pre-set unlocking angle with the unlocking starting line 5011. A sector 5014 centred on the unlocking reference point with a radius of a pre-set length may also be displayed. The sector 5014 is defined on one side by the unlocking starting line 5011 and on the other side by a straight line defined by the unlocking reference point and the current position of the touch point. When the finger or stylus of the user moves within a scope of the unlocking angle, the sector 5014 is displayed on the screen with distinct visual effect, which brings the user the experience of driving the sector to scan the area angle by a finger operation. When an angle 5015 reaches the pre-set standard, the mobile phone may be unlocked.

In conclusion, it can be seen that with the method for unlocking a screen and the system for installing a screen, it is determined whether to unlock the screen by calculating an angle between a starting position and a current position of a touch point on the screen with the unlocking reference point as a vertex of the angle. With a technical solution of the disclosure, no path or destination position for screen unlocking is defined, with more casual operation, enhanced user experience, and simpler setting, thereby facilitating usage. Moreover, unlocking by mistake can also be prevented by the setting.

What described are merely embodiments of the disclosure, and are not intended to limit the protection scope of the disclosure.

The invention claimed is:

1. A method for unlocking a screen, comprising:
    detecting a starting position of a touch point on a screen;
    selecting an unlocking reference point in the screen according to the starting position of the touch point on the screen;
    detecting, while the touch point moves on the screen, a current position of the touch point on the screen; and
    calculating an angle between the starting position of the touch point and the current position of the touch point with the unlocking reference point as a vertex of the angle, and unlocking the screen when the angle is larger than a pre-set unlocking angle,
    wherein the selecting an unlocking reference point in the screen according to the starting position of the touch point on the screen comprises:
    dividing the screen into at least one area according to a pre-set rule;
    generating a benchmark point in each area resulting from dividing the screen; and
    selecting a benchmark point meeting a pre-set standard as the unlocking reference point according to the starting position of the touch point,
    wherein the selecting a benchmark point meeting a pre-set standard as the unlocking reference point comprises:
    setting a standard distance between the starting position of the touch point and a benchmark point;
    calculating a distance between the starting position of the touch point and a benchmark point of an area containing the starting position of the touch point, wherein the area containing the starting position of the touch point is one of the at least one area;

comparing the calculated distance with the standard distance;

selecting, when the calculated distance is larger than the standard distance, the benchmark point of the area containing the starting position of the touch point as the unlocking reference point; or selecting, among the at least one area, when the calculated distance is smaller than the standard distance, a benchmark point in an area nearest to the starting position of the touch point other than the area containing the starting position of the touch point as the unlocking reference point.

2. The method according to claim 1, further comprising: after the position of the unlocking reference point is determined, displaying, on the screen, an unlocking starting line starting from the unlocking reference point and passing through the starting position of the touch point.

3. The method according to claim 2, further comprising:

displaying, on the screen, an unlocking target line starting from the unlocking reference point and forming an angle equal to the pre-set unlocking angle with the unlocking starting line.

4. The method according to claim 3, further comprising:

displaying, on the screen, a sector centred on the unlocking reference point with a radius of a pre-set length, wherein the sector is defined on one side by the unlocking starting line and on the other side by a straight line defined by the unlocking reference point and the current position of the touch point.

5. A mobile terminal, comprising:

at least one hardware processor; and memory in electronic communication with the at least one hardware processor, storing instructions executable by the at least one hardware processor for:

detecting a starting position of a touch point on a screen;

selecting an unlocking reference point in the screen according to the starting position of the touch point on the screen;

detecting, while the touch point moves on the screen, a current position of the touch point on the screen;

calculating an angle between the starting position of the touch point and the current position of the touch point with the unlocking reference point as a vertex of the angle; and unlocking the screen when the angle is larger than a pre-set unlocking angle, wherein the instructions are executable by the at least one hardware processor for:

dividing the screen into at least one area according to a pre-set rule;

generating a benchmark point in each area resulting from dividing the screen; and selecting a benchmark point meeting a pre-set standard as the unlocking reference point according to the starting position of the touch point, wherein the instructions are executable by the at least one hardware processor for:

setting a standard distance between the starting position of the touch point and a benchmark point;

calculating a distance between the starting position of the touch point and a benchmark point of an area containing the starting position of the touch point, wherein the area containing the starting position of the touch point is one of the at least one area;

comparing the calculated distance with the standard distance;

selecting, when the calculated distance is larger than the standard distance, the benchmark point of the area containing the starting position of the touch point as the unlocking reference point; or selecting, among the at least one area, when the calculated distance is smaller than the standard distance, a benchmark point in an area nearest to the starting position of the touch point other than the area containing the starting position of the touch point as the unlocking reference point.

6. The mobile terminal according to claim 5, wherein the instructions are executable by the at least one hardware processor for:

setting the pre-set unlocking angle.

7. The mobile terminal according to claim 5, wherein the instructions are executable by the at least one hardware processor for:

displaying, on the screen, an unlocking starting line starting from the unlocking reference point and passing through the starting position of the touch point.

8. The mobile terminal according to claim 7, wherein the instructions are executable by the at least one hardware processor for:

displaying, on the screen, an unlocking target line starting from the unlocking reference point and forming an angle equal to the pre-set unlocking angle with the unlocking starting line.

9. The mobile terminal according to claim 8, wherein the instructions are executable by the at least one hardware processor for:

displaying, on the screen, a sector centred on the unlocking reference point with a radius of a pre-set length, wherein the sector is defined on one side by the unlocking starting line and on the other side by a straight line defined by the unlocking reference point and the current position of the touch point.

* * * * *